(12) United States Patent
Yun

(10) Patent No.: US 12,515,526 B2
(45) Date of Patent: Jan. 6, 2026

(54) SYSTEM FOR AND METHOD OF CONVERTING REGENERATIVE BRAKING ENERGY IN ECO-FRIENDLY VEHICLE

(71) Applicants: HYUNDAI MOTOR COMPANY, Seoul (KR); KIA CORPORATION, Seoul (KR)

(72) Inventor: Nam-Seok Yun, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/659,772

(22) Filed: May 9, 2024

(65) Prior Publication Data
US 2025/0074196 A1 Mar. 6, 2025

(30) Foreign Application Priority Data
Aug. 30, 2023 (KR) .................. 10-2023-0114380

(51) Int. Cl.
 *B60L 58/26* (2019.01)
 *B60H 1/00* (2006.01)
 (Continued)

(52) U.S. Cl.
 CPC .......... *B60L 1/003* (2013.01); *B60H 1/00278* (2013.01); *B60H 1/00907* (2013.01);
 (Continued)

(58) Field of Classification Search
 CPC .......... B60L 58/15; B60L 1/003; B60L 58/27; B60L 58/26; B60L 7/10; B60H 1/00278; B60H 1/00392; B60H 1/00907; B60H 1/3208; B60H 2001/00307; B60H 2001/00928; B60H 2001/3285; B60Y 2200/91; Y02T 10/7072; Y02T 10/72
 See application file for complete search history.

(56) References Cited

U.S. PATENT DOCUMENTS

| | | | | |
|---|---|---|---|---|
| 9,731,622 B2 * | 8/2017 | Rawlinson | ........ | H01M 10/6568 |
| 11,766,953 B2 * | 9/2023 | Cox | .................... | H01M 10/663 |
| | | | | 429/71 |

(Continued)

FOREIGN PATENT DOCUMENTS

WO WO-2018195898 A1 * 11/2018 ......... B60H 1/00921

*Primary Examiner* — Calvin Cheung
(74) *Attorney, Agent, or Firm* — Fish & Richardson P.C.

(57) ABSTRACT

A system performs a method of converting regenerative braking energy in an eco-friendly vehicle. When an amount of remaining battery power reaches or exceeds a predetermined threshold during regenerative braking, a controller of the system in which a battery pack and a passenger air-conditioning apparatus are connected by a coolant circulation line connected to a battery chiller to which an outer refrigerant line is connected, controls: consumption of the regenerative braking energy by a compressor; switching of the flow of an air-conditioning refrigerant by a 4-way valve toward a condenser or radiator of an outer heat exchanger; evaporation of the air-conditioning refrigerant by expansion operation of an expansion valve in the direction of a battery chiller or an expansion valve in the direction of the outer heat exchanger; and operating of the outer heat exchanger for heat release or absorption to or from the outside.

17 Claims, 5 Drawing Sheets

(51) Int. Cl.
*B60L 1/00* (2006.01)
*B60L 7/10* (2006.01)
*B60L 58/27* (2019.01)

(52) U.S. Cl.
CPC .............. *B60L 7/10* (2013.01); *B60L 58/26* (2019.02); *B60L 58/27* (2019.02); *B60H 2001/00307* (2013.01); *B60H 2001/00928* (2013.01)

(56) References Cited

U.S. PATENT DOCUMENTS

| | | | |
|---|---|---|---|
| 12,269,369 B2* | 4/2025 | Zhang | H01M 10/6568 |
| 2002/0043413 A1* | 4/2002 | Kimishima | B60K 6/40 |
| | | | 903/903 |
| 2013/0274975 A1 | 10/2013 | Gregg et al. | |
| 2015/0079433 A1* | 3/2015 | Tamai | B60L 58/26 |
| | | | 429/62 |
| 2018/0006347 A1* | 1/2018 | Porras | H01M 10/486 |
| 2019/0221899 A1* | 7/2019 | Tomai | H01M 10/613 |
| 2019/0273296 A1* | 9/2019 | Porras | H01M 10/635 |
| 2021/0331553 A1* | 10/2021 | Healy | B60L 58/27 |
| 2023/0012558 A1* | 1/2023 | Richardson | B60H 1/32281 |
| 2023/0226885 A1* | 7/2023 | Gopalan | B60H 1/00899 |
| | | | 62/244 |

* cited by examiner

<OPERATIONAL EXAMPLE: CHILLER>

<OPERATIONAL EXAMPLE: BATTERY HEATER + HEAT PUMP>

<OPERATIONAL EXAMPLE: BATTERY HEATER + CHILLER>

SYSTEM FOR AND METHOD OF CONVERTING REGENERATIVE BRAKING ENERGY IN ECO-FRIENDLY VEHICLE

CROSS-REFERENCE(S) TO RELATED APPLICATIONS

This application claims priority to Korean Patent Application No. 10-2023-0114380, filed on Aug. 30, 2023, which is incorporated herein by reference in its entirety.

TECHNICAL FIELD

The present disclosure relates to a system for converting regenerative braking energy in an eco-friendly vehicle and, more particularly, to a system for and a method of converting regenerative braking energy in an eco-friendly vehicle, the system and the method being capable of converting electric energy generated when electric power generated by regenerative braking overcharges a battery.

BACKGROUND

As a way of increasing energy efficiency during braking, vehicles may charge a battery by performing regenerative braking. However, among eco-friendly vehicles, electric vehicles used for public transport are notable. These large-sized commercial vehicles, such as electric buses, frequently come to a stop to pick up or drop off passengers. Because of this, they also make frequent use of the regenerative braking. Thus, a battery is also frequently charged as many times as the regenerative braking is performed.

Therefore, there is a need to prevent battery degradation from occurring due to overcharging when the battery is charged through the use of regenerative braking. As is the case with the large-sized commercial vehicles, tight braking regulations (for example, regulations on the use of an auxiliary brake) require the use of the regenerative braking even when a state-of-charge (SOC) of the battery is already high. For this reason, there is also a need for a SOC management method for preventing the battery degradation resulting from the overcharging of the battery.

In a system for converting electric energy, a heater for air-conditioning, an air-conditioner, and the like operate in unison. Accordingly, regenerative braking energy generated when a predetermined SOC condition is reached or exceeded is consumed in an apparatus or a system other than the battery. Thus, a SOC can be managed for preventing the battery degradation.

As an example, the heater for air-conditioning and the air-conditioner operate together when performing the regenerative braking. Thus, energy generated when performing the regenerative braking is consumed. Accordingly, the regenerative braking can be performed in compliance with the regulations for braking, and the overcharging of the battery can be prevented when the predetermined SOC condition is reached or exceeded.

However, when an air-conditioning system operates for consuming electric energy generated during the regenerative braking, cooling air and warming air are discharged into an in-vehicle passenger compartment. This could lead to side effects such as discomfort for passengers. Furthermore, operation of the air-conditioning system at an undesired time may be recognized as a failure in the air-conditioning system.

The problem with the operation of the air-conditioning system at an undesired time can be solved by installing a dedicated valve and pipe for changing a path for discharging regenerative braking energy, along with a separate dedicated heater for discharging this regenerative braking energy, between a heat exchanger and a PE cooling radiator in the related art. During the regenerative braking, the regenerative braking energy can be directed from the dedicated heater to the PE cooling radiator by changing an in-vehicle coolant path. However, the additional installation of the component can lead to an increase in weight and manufacturing cost.

SUMMARY

An object of the present disclosure, which is made in view of the above-mentioned problem, is to provide a system for and a method of converting regenerative braking energy in an eco-friendly vehicle, the system and the method being capable of converting electric energy generated when a battery is overcharged with electric power generated during regenerative braking. With the system and the method, battery degradation can be prevented without any side effects. Particularly, by driving a compressor of a passenger air-conditioning apparatus, the electric energy can be consumed. In addition, a battery chiller can perform heat exchange between an air-conditioning refrigerant and a battery coolant. Thus, temperature management can also be performed for battery heat.

In order to accomplish the above-mentioned object, according to an aspect of the present disclosure, there is provided a method of converting regenerative braking energy in an eco-friendly vehicle, the eco-friendly vehicle in which heat exchange occurs between a battery coolant and an air-conditioning refrigerant, using a battery chiller to which a battery coolant circulation line for a battery pack and an outer refrigerant line for a passenger air-conditioning apparatus are connected, the method including: determining, by a controller, whether to execute a battery cooling mode for cooling the battery coolant or a battery warming mode for warming the battery coolant, when an amount of remaining battery power of the battery pack reaches or exceeds a predetermined threshold during regenerative braking by a regenerative braking apparatus; and releasing heat of the air-conditioning refrigerant to the outside through an outer heat exchanger, while the regenerative braking energy is consumed, a 4-way valve switches a path, thereby directing the flow of the air-conditioning refrigerant toward a condenser of the outer heat exchanger, and heat of the battery coolant is absorbed within a battery chiller due to evaporation of the air-conditioning refrigerant by an expansion operation of an expansion valve in the direction of an inlet in the battery chiller, thereby circulating the air-conditioning refrigerant, by driving a compressor while the battery cooling mode is executed, the compressor being installed on the outer refrigerant line, along with the 4-way valve, the outer heat exchanger, and the expansion valve in the direction of the inlet in the battery chiller.

In the method, when a minimum temperature for battery heat management of the battery coolant is reached while the battery cooling mode is executed, switching to a battery constant-temperature mode for maintaining temperature of the battery coolant may take place, and in the battery constant-temperature mode, while the air-conditioning refrigerant circulates along the outer refrigerant line, the driving of the compressor may be maintained, the flow of the air-conditioning refrigerant toward the condenser of the outer heat exchanger may be maintained due to the switching of the path by the 4-way valve, heat exchange may continue in the battery chiller due to the evaporation of the air-conditioning refrigerant by the expansion operation of the expansion valve, and the minimum temperature for battery heat management may be maintained due to the warming of the battery coolant in a battery warmer installed on a battery coolant in-line along which the battery coolant flows.

In order to accomplish the above-mentioned object, according to another aspect of the present disclosure, there is provided a method of converting regenerative braking energy in an eco-friendly vehicle, the eco-friendly vehicle in which heat exchange occurs between a battery coolant and an air-conditioning refrigerant, using a battery chiller to which a battery coolant circulation line for a battery pack and an outer refrigerant line for a passenger air-conditioning apparatus are connected, the method including: determining, by a controller, whether to execute a battery cooling mode for cooling the battery coolant or a battery warming mode for warming the battery coolant, when an amount of remaining battery power of the battery pack reaches or exceeds a predetermined threshold during regenerative braking by a regenerative braking apparatus; and absorbing heat from the outside through an outer heat exchanger, while the regenerative braking energy is consumed, a 4-way valve switches a path, thereby directing the flow of the air-conditioning refrigerant toward a radiator of the outer heat exchanger, and heat of the air-conditioning refrigerant is transferred to the battery coolant within a battery chiller due to evaporation of the air-conditioning refrigerant by an expansion operation of an expansion valve in the direction of an outlet in the outer heat exchanger, thereby circulating the air-conditioning refrigerant, by driving a compressor while the battery cooling mode is executed, the compressor being installed on the outer refrigerant line, along with the 4-way valve, the outer heat exchanger, and the expansion valve in the direction of the inlet in the outer heat exchanger.

In the method, when a minimum temperature for battery heat management of the battery coolant is reached while the battery warming mode is executed, switching to a battery constant-temperature mode for maintaining temperature of the battery coolant may take place, and in the battery constant-temperature mode, while the air-conditioning refrigerant circulates along the outer refrigerant line, one of the driving of the compressor, the switching of the path by the 4-way valve, the expansion operation of the expansion valve, the evaporation of the air-conditioning refrigerant, the heat exchange in the battery chiller, the absorption of heat in the outer heat exchanger from the outside may be maintained, and the minimum temperature for battery heat management may be maintained due to the warming of the battery coolant in a battery warmer installed on a battery coolant in-line along which the battery coolant flows.

In order to accomplish the above-mentioned object, according to still another aspect of the present disclosure, there is provided a system for converting regenerative braking energy in an eco-friendly vehicle, the system, installed on a vehicular roof, including: a passenger air-conditioning apparatus in which an outer refrigerant line is connected to a battery chiller connected to a battery coolant circulation line for a battery pack; and a controller, wherein, when an amount of remaining battery power reaches or exceeds a predetermined threshold during regenerative braking that uses a regenerative braking apparatus, the controller executes a battery cooling mode in which the regenerative energy is consumed, the 4-way valve switches an air-conditioning refrigerant path toward a condenser of an outer heat exchanger, and heat of a battery coolant is absorbed by evaporating an air-conditioning refrigerant by an expansion operation of an expansion valve in the direction of a battery chiller, thereby releasing the heat to the outside in the outer heat exchanger, by driving a compressor while the battery cooling mode is executed, the compressor being installed on the outer refrigerant line, along with the 4-way valve, the outer heat exchanger, and the expansion valve in the direction of the inlet in the battery chiller, or executes a battery warming mode in which the regenerative braking energy is consumed, the 4-way valve switches the air-conditioning refrigerant path toward a radiator of the outer heat exchanger, heat is transferred to the battery coolant is absorbed by evaporating the air-conditioning refrigerant by an expansion operation of an expansion valve in the direction of the outer heat exchanger, thereby absorbing heat from the outside in the outer heat exchanger, and the battery coolant is warmed in a battery warmer, by driving the compressor.

In the system, when a minimum temperature for battery heat management of the battery coolant is reached while the battery cooling mode is executed, the controller may maintain the minimum temperature for battery heat management by executing a battery constant-temperature mode in which, while the air-conditioning refrigerant circulates along the outer refrigerant line, one of the driving of the compressor, the switching of the path by the 4-way valve, the expansion operation of the expansion valve, the evaporation of the air-conditioning refrigerant, the heat exchange in the battery chiller, and the releasing of heat in the outer heat exchanger to the outside is maintained and in which the battery coolant is warmed in a battery warmer installed on a battery coolant in-line along which the battery coolant flows.

In the system, when the minimum temperature for battery heat management of the battery coolant is reached while the battery warming mode is executed, the controller may maintain the minimum temperature for battery heat management by executing the battery constant-temperature mode in which, while the air-conditioning refrigerant circulates along the outer refrigerant line, one of the driving of the compressor, the switching of the path by the 4-way valve, the expansion operation of the expansion valve, the evaporation of the air-conditioning refrigerant, the heat exchange in the battery chiller, and the absorption of heat in the outer heat exchanger from the outside is maintained and in which the battery coolant is warmed in the battery warmer installed on the battery coolant in-line along which the battery coolant flows.

In the system for and the method of converting regenerative braking energy in an eco-friendly vehicle according to the present disclosure, energy generated by the regenerative braking is input, for consumption, into a compressor for air-conditioning (for example, an electric compressor (ECOMP)). Thus, battery degradation can be prevented from occurring due to overcharging when the regenerative braking is used in a situation where a SOC of 90% is reached or exceeded. Particularly, the electric energy generated by the regenerative braking can be converted in large-sized commercial vehicles that must comply with the regulations on auxiliary brakes. These regulations on braking require the use of the regenerative braking even when a SOC is already high.

In the system for and the method of converting regenerative braking energy in an eco-friendly vehicle according to the present disclosure, with a battery coolant chiller and a heat exchanger (that is, a condenser) that is a passenger air-conditioning heater pump, the energy input into the compressor for air-conditioning (for example, an electric compressor (ECOMP)) can be consumed by repeatedly absorbing heat of outside air and releasing heat to the outside air. Particularly, unlike in the related art, the 4-way valve is used. As a result, the regenerative braking energy can be continuously converted, independent of which one of the passenger cooling and warming modes is executed.

In addition, in the system for and the method of converting regenerative braking energy in an eco-friendly vehicle according to the present disclosure, electric energy, which is generated when a battery is overcharged with electric power generated by the regenerative braking, is converted. The battery gradation can be prevented without any side effects. Particularly, the electric energy can be consumed by driving the compressor (for example, the electric compressor (ECOMP). Furthermore, by exchanging heat with the battery coolant in the battery chiller, temperature management can be performed for battery heat management.

DETAILED DESCRIPTION

An implementation of the present disclosure is in detail described below with reference to the accompanying drawings. The implementation is exemplary and may be practiced in various forms by a person of ordinary skill in the art to which the present disclosure pertains. Therefore, the present disclosure is not limited to the implementation described below.

Figure 1:
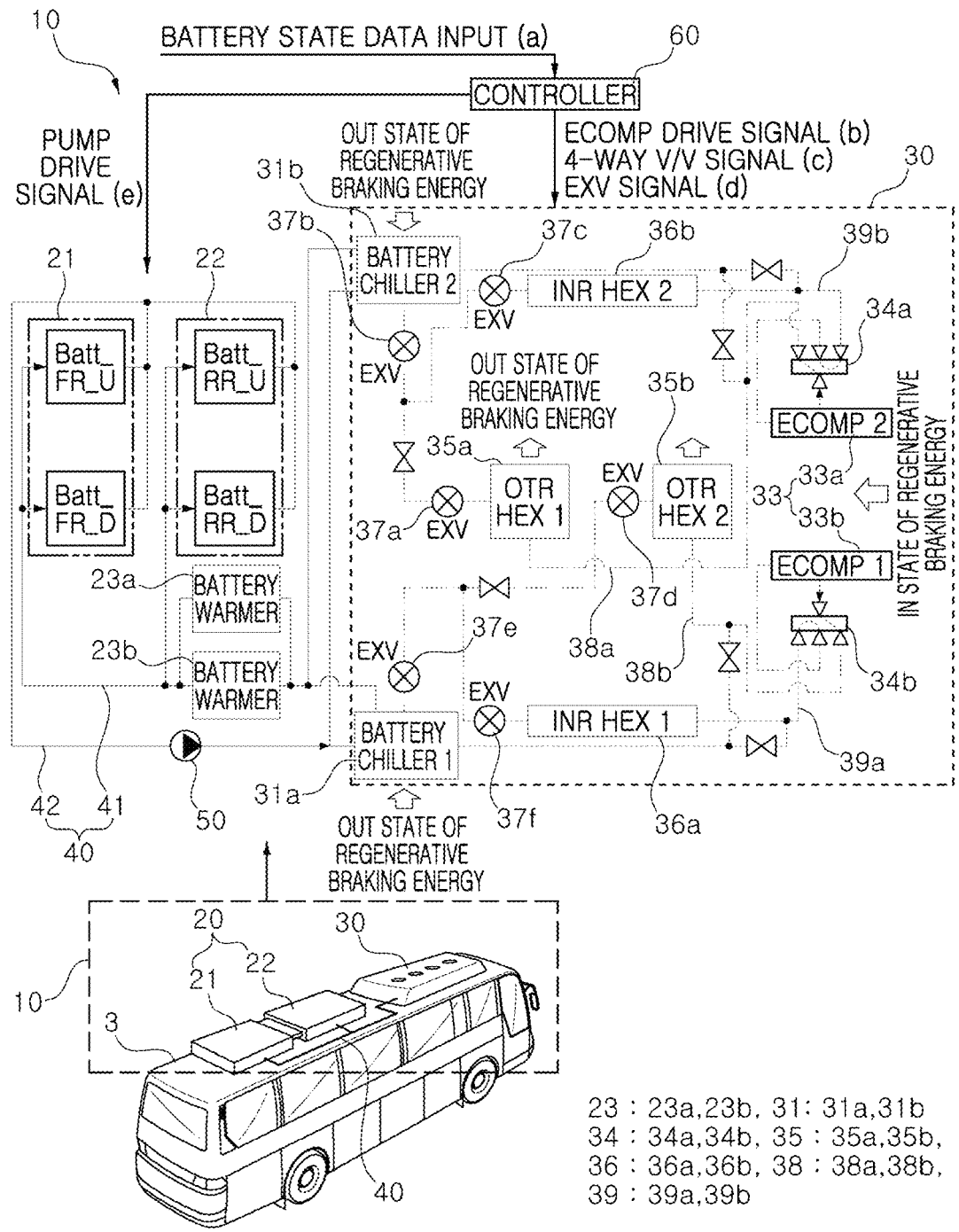
FIG. 1 is a diagram illustrating an example of an eco-friendly vehicle in which a system for converting regenerative braking energy is installed.

In some implementations, with reference to FIG. 1, a regenerative braking energy conversion system 10 can be installed on a vehicular roof 3 of an eco-friendly vehicle 1, and a system 10 for converting regenerative braking energy is configured to include a battery pack 20, a passenger air-conditioning apparatus 30, a battery coolant circulation line 40, and a controller 60.

For example, the eco-friendly vehicle 1 is exemplified by a large-sized occupant bus that includes a regenerative braking apparatus and uses a battery-driven motor. However, examples of the eco-friendly vehicle 1 include an eco-friendly commercial vehicle, such as a truck, that includes a regenerative braking apparatus and uses a battery-driven motor, and also a hybrid vehicle that uses an engine and a motor as driving sources.

Specifically, the battery pack 20 and the passenger air-conditioning apparatus 30 are connected to the battery coolant circulation line 40 along which a battery coolant circulates. The battery coolant circulation line 40 is connected to a battery chiller 31 of the passenger air-conditioning apparatus 30, thereby constituting a circuit in which the battery coolant can exchange heat with an air-conditioning refrigerant.

In some examples, the battery pack 20 is configured to include a front battery 21, a rear battery 22, and a battery warmer 23. The front battery 21 provides power for driving front wheels of the eco-friendly vehicle 1. The rear battery 22 provides power for driving rear wheels. The battery warmer 23 controls battery coolant temperature by performing heat exchange on the battery coolant circulating along the battery coolant circulation line 40.

For instance, the battery warmer 23 is configured to include a first battery warmer 23a and a second battery warmer 23b that control the battery coolant temperature in a low-temperature environment. The first battery warmer 23a and the second battery warmer 23b are arranged in parallel on a battery coolant in-line 41.

In addition, a heater may be provided to the first battery warmer 23a and the second battery warmer 23b and can operate to increase the temperature of the battery coolant. The operation of the heater may be controlled by the controller 60 or a battery controller (for example, a battery management system) that adjusts the battery coolant temperature.

Therefore, the battery pack 20 has the same configuration as a normal battery pack 20.

For example, the passenger air-conditioning apparatus 30 functions as a cooling and warming apparatus that is a type of heat pump. When the flow of a refrigerant is reversed according to an air-conditioner cooling or warming mode, an evaporator and a condenser of a heat exchanger can function to absorb heat from a low-temperature heat source and release the absorbed heat into another space with a high temperature.

To this end, the passenger air-conditioning apparatus 30 includes the battery chiller 31, a compressor 33, a 4-way valve 34, heat exchangers (HEX) 35 and 36, an expansion valve 37, and air-conditioning refrigerant circulation lines 38 and 39.

As an example, the battery chiller 31, together with the battery coolant circulation line 40 for the battery pack 20, forms a heat exchange circuit, in a state where the air-conditioning refrigerant circulation lines 38 and 39 for the passenger air-conditioning apparatus 30 are connected to the battery chiller 31. In this case, in a state where the air-conditioning refrigerant circulation lines 38 and 39 and the battery coolant circulation line 40 are separated from each other, the heat exchange circuit is formed.

Therefore, according to an air-conditioner operating mode, the battery chiller 31 operates to lower or raise the temperature of the battery coolant, flowing into the battery chiller 31 through the heat exchange circuit, to the temperature of the air-conditioning refrigerant, flowing along the air-conditioning refrigerant circulation lines 38 and 39.

As an example, the compressor 33 is driven according to the air-conditioner operating mode. In a case where, particularly during regenerative braking in the eco-friendly vehicle 1, an amount of remaining battery power of the battery pack 20 reaches or exceeds a predetermined threshold, the compressor 33 is driven with regenerative braking energy (that is, electric power), thereby preventing battery overcharging and subsequent battery degradation. In this case, a fan motor may be provided to the compressor 33, and thus the compressor 33 can be driven with the regenerative braking energy (that is, the electric power).

As an example, the 4-way valve 34 is turned on or off using electromagnetism. When the compressor 33 is driven with the regenerative braking energy (that is, the electric power), according to a battery cooling mode (S40), a battery warming mode (S50), or a battery constant-temperature mode (S70) (refer to FIG. 2), the 4-way valve 34 determines the direction in which the air-conditioning refrigerant flowing out of a high-pressure discharge pipe of the compressor 33 flows to condensers and evaporators of the heat exchangers 35 and 36. Furthermore, the 4-way valve 34 determines how the refrigerant that flows to the expansion valve 37 and evaporates therein flows toward a low-pressure intake pipe of the compressor 33.

As an example, the heat exchangers 35 and 36 are configured as an outer heat exchanger (HEX) 35 and an inner heat exchanger (HEX) 36, respectively, that function as both the condenser and the evaporator for the air-conditioner refrigerator. The outer heat exchanger 35 is connected to the high-pressure discharge pipe of the compressor 33 through the air-conditioning refrigerant circulation lines 38 and 39. The inner heat exchanger 36 is connected to the low-pressure intake pipe of the compressor 33 through the air-conditioning refrigerant circulation lines 38 and 39.

Therefore, when the 4-way valve 34 reverses the flow of the air-conditioning refrigerant, the outer heat exchanger 35 and the inner heat exchanger 36 can switch between functions of the evaporator and the condenser, thereby taking up heat from a high-temperature heat source or absorbing heat from a low-temperature heat source.

In this way, the regenerative braking energy (that is, the electric power) is consumed by the compressor 33 in a manner that provides drive power, by the battery chiller 31 in a manner that exchanges heat, and by the outer heat exchanger 35 in a manner that releases heat. In this case, when the regenerative braking energy is consumed in a manner that provides drive power, this consumption may be defined as an IN state of the regenerative braking energy. In contrast, when the regenerative braking energy is consumed in a manner that exchanges heat or in a manner that releases heat, this consumption may be defined as an OUT state of the regenerative braking energy.

As an example, the expansion valve 37 is installed on the air-conditioning refrigerant circulation lines 38 and 39. When a refrigerant line path is open (EXV OPEN) or closed (EXV CLOSE), the expansion valve 37 performs expansion (EXV EXPANSION) that sprays the air-conditioning refrigerant in the form of droplets through a narrow hole for evaporation (that is, heat absorption).

As an example, the air-conditioning refrigerant circulation lines 38 and 39 are configured as an outer refrigerant line 38 and an inner refrigerant line 39, respectively, that form a circulation path for the air-conditioning refrigerant. The outer refrigerant line 38 connects the compressor 33 (that is, the high-pressure discharge pipe) and the 4-way valve 34 to each other, and the outer heat exchanger 35 and the battery chiller 31 to each other. The inner refrigerant line 39 connects a front end portion of the outer heat exchanger 35 and the inner heat exchanger 36 to each other and the 4-way valve 34 and the compressor 33 (that is, the low-pressure intake pipe).

As an example, the battery coolant circulation line 40 is configured as the battery coolant in-line 41 and a battery coolant out-line 42. The battery coolant in-line 41 runs from a first battery chiller 31*a* and a second battery chiller 31*b* of the battery chiller 31 to respective coolant inlets in the front battery 21 and the rear battery 22 of the battery pack 20. The battery coolant out-line 42 runs from respective coolant outlets in the front battery 21 and the rear battery 22 of the battery pack 20 to the first battery chiller 31*a* and the second battery chiller 31*b* of the battery chiller 31.

Therefore, the battery coolant in-line 41 is separated into two lines, and these two lines are connected to the first battery chiller 31*a* and the second battery chiller 31*b*, respectively. The battery coolant out-line 42 is separated into two lines, and these two lines are connected to the first battery chiller 31*a* and the second battery chiller 31*b*, respectively. The battery coolant in-line 41 and the battery coolant out-line 42 are connected to each other within the first battery chiller 31*a* and the second battery chiller 31*b*, thereby forming a closed circuit along which the battery coolant circulates.

In addition, the battery warmer 23 and the second battery warmer 23*b* are installed in parallel on the battery coolant in-line 41. A battery coolant pump 50 is installed on the battery coolant out-line 42 and thus circulates the battery coolant. In this case, the battery coolant pump 50 may be controlled by the controller 60 and may be controlled by a battery controller (for example, a battery management system) that adjusts the battery coolant temperature.

As an example, the controller 60 monitors the battery pack 20 and drives the compressor 33 and the fan motor of the passenger air-conditioning apparatus 30 in such a manner as to consume the regenerative braking energy (that is, the electric power). While this is done, the controller 60 may control the 4-way valve 34 and the expansion valve 37, and, when consuming the regenerative braking energy (that is, the generative power), may control driving of the battery coolant pump 50.

To this end, the controller 60 includes an input unit through which battery state data (a) are input and an output unit through control signals (b, c, d, and e) associated with consumption of the regenerative braking energy (that is, the electric power) are output. When consuming the regenerative braking energy, the controller 60 operates as a central processing unit that executes logic for the battery cooling mode (S40), the battery warming mode (S50), and the battery constant-temperature mode (S70) (refer to FIG. 2).

Examples of the battery state data (a) that are to be input include battery temperature, a state of charge (SOC), and the like. The control signals (b, c, d, and e) may be divided into an ECOMP drive signal (b) for driving the compressor 33 and the fan motor, a 4-WAY V/V signal (c) for switching operation of the 4-way valve 34, an EXV signal (b) for opening (EXV OPEN), closing (EXV CLOSE), or expanding (EXV EXPANSION) of the expansion valve 37, and a pump drive signal (e) for driving the battery coolant pump 50.

The above-mentioned constituent elements are configured as follows. The battery chiller 31 is comprised of the first battery chiller 31*a* and the second battery chiller 31*b*. The compressor 33 is comprised of a first compressor 33*a* and a second compressor 33*b*. The 4-way valve 34 is comprised of a first 4-way valve 34*a* and a second 4-way valve 34*b*. The outer heat exchanger 35 is comprised of a first outer heat exchanger 35*a* and a second outer heat exchanger 35*b*. The inner heat exchanger 36 is comprised of a first inner heat exchanger 36*a* and a second inner heat exchanger 36*b*. The outer refrigerant line 38 is comprised of a first outer refrigerant line 38*a* and a second outer refrigerant line 38*b*. The inner refrigerant line 39 is comprised of a first inner refrigerant line 39*a* and a second inner refrigerant line 39*b*.

As an example, the first outer refrigerant line 38*a* is a closed circuit that connects the second battery chiller 31*b*, the first compressor 33*a*, the first 4-way valve 34*a*, and the first outer heat exchanger 35*a* to each other. The air-conditioning refrigerant circulates along the first outer refrigerant line 38*a*. Furthermore, the second outer refrigerant line 38*b* is a closed circuit that connects the first battery chiller 31*a*, the second compressor 33*b*, the second 4-way valve 34b, and the second outer heat exchanger 35b to each other. The air-conditioner refrigerant circulates along the second outer refrigerant line 38b.

Therefore, the first expansion valve 37a of the expansion valve 37 is installed on an outlet line of the first outer heat exchanger 35a in an outer refrigerant discharge section, connecting an inlet in the second battery chiller 31b and an outlet in the first outer heat exchanger 35a, of the first outer refrigerant line 38a. Accordingly, the second expansion valve 37b is installed on an inlet line of the second battery chiller 31b. A fourth expansion valve 37d of the expansion valve 37 is installed on an outlet line of the second outer heat exchanger 35b in an outer refrigerant discharge section connecting an input in the first battery chiller 31a and an outlet in the second outer heat exchanger 35b. Accordingly, a fifth expansion valve 37e is installed on an inlet line of the first battery chiller 31a.

Particularly, an outer refrigerant return section of the first outer refrigerant line 38a is a branch section that connects an outlet in the second battery chiller 31b and the first 4-way valve 34a to each other. The outer refrigerant return section is connected to an inlet in the first outer heat exchanger 35a. An outer refrigerant return section of the second refrigerant line 38b is a branch section that connects an outlet in the first battery chiller 31a and the second 4-way valve 34b to each other. The outer refrigerant return section is connected to an inlet in the first outer heat exchanger 35a. In this case, a valve for regulating the flow of the air conditioner refrigerant may be installed in the outer refrigerant return section and the branch section.

As an example, the first inner refrigerant line 39a is a closed circuit that branches off from an outer refrigerant line section of the first outer refrigerant line 38a and connects the second inner heat exchanger 36b, the first 4-way valve 34a, and the first compressor 33a. The air-conditioner refrigerant circulates along the first inner refrigerant line 39a. A third expansion valve 37c of the expansion valve 37 is installed on an inlet line of the second inner heat exchanger 36b.

The second inner refrigerant line 39b is a closed circuit that branches off from an outer refrigerant line section of the second outer refrigerant line 38b and connects the first inner heat exchanger 36a, the second 4-way valve 34b, and the second compressor 33b to each other. The air-conditioner refrigerant circulates along the second inner refrigerant line 39b. A sixth expansion valve 37f of the expansion valve 37 is installed on an inlet line of the first inner heat exchanger 36a.

Figure 2:
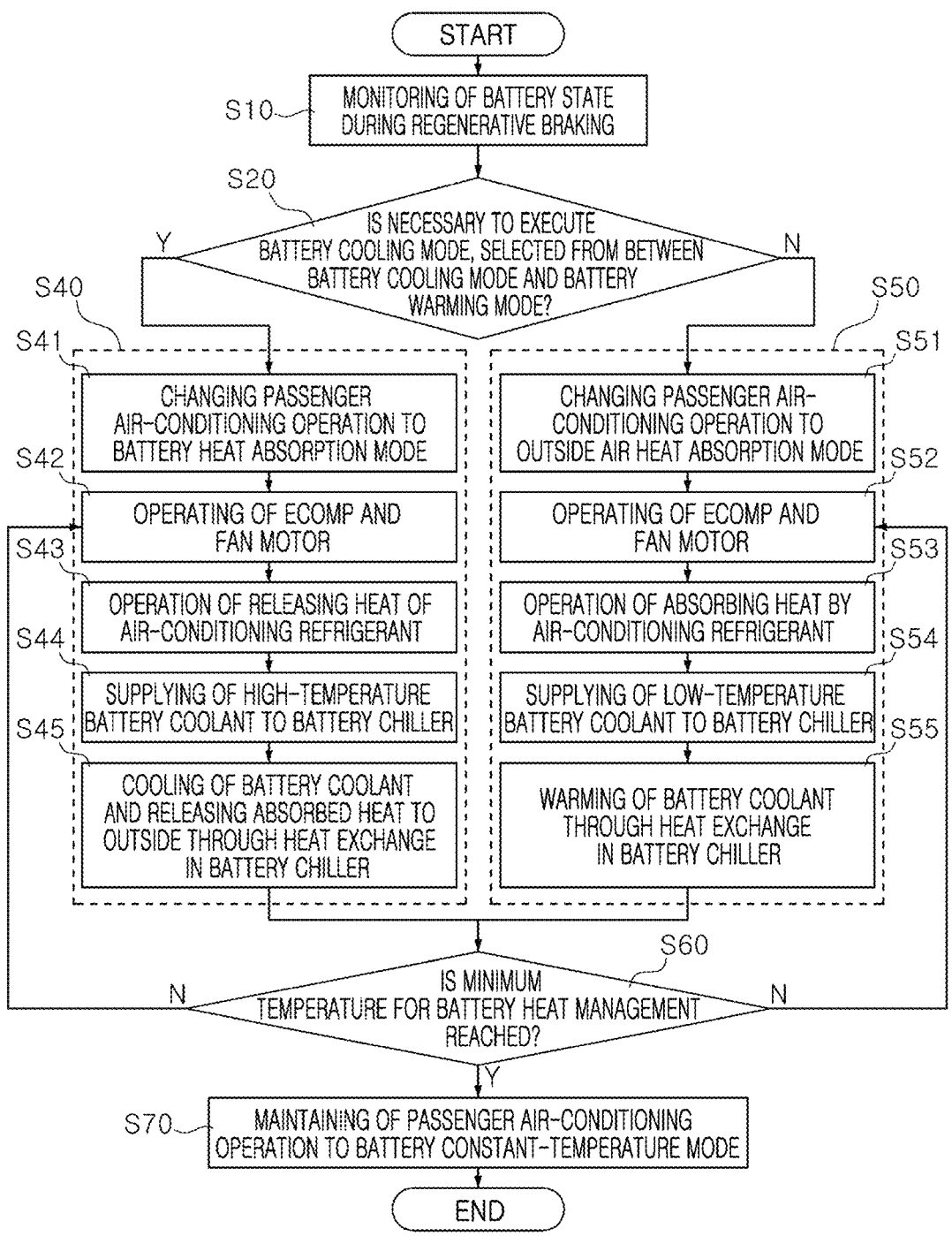
FIG. 2 is a flowchart illustrating a method of converting regenerative braking energy in an eco-friendly vehicle.

FIG. 2 illustrates a method of converting regenerative braking energy in an eco-friendly vehicle.

As illustrated, the method of converting regenerative braking energy in an eco-friendly vehicle is performed as follows. The controller 60 monitors a battery state during regenerative braking (S10). When the monitoring result indicates one of a predetermined threshold-reaching or exceeding amount of remaining battery power (that is, a SOC), battery overcharging, and battery degradation, the controller 60 selects a mode for operating the passenger air-conditioning apparatus 30 of the system 10 for converting regenerative braking energy (S20). The system 10 is used to consume regenerative braking energy (that is, electric power). The controller 60 executes the battery cooling mode (S40) and then switches to executing the battery constant-temperature mode (S70). Alternatively, the controller 60 executes the battery warming mode (S50) and then switches to executing the battery constant-temperature mode (S70).

As an example, in the monitoring (S10) of the battery state during the regenerative braking, as illustrated in FIG. 1, one of the predetermined threshold-reaching or exceeding amount of remaining battery power, the battery overcharging, and the battery degradation is checked on the basis of battery temperature and an amount of charging (SOC). It is determined whether or not the battery cooling mode, selected from between the battery cooling mode and the battery warming mode, is executed (S20). The executing of the battery cooling mode is determined when the result of the monitoring indicates a need to cool a battery coolant. The executing of the battery warming mode is determined when the result of the monitoring indicates a need to warm the battery coolant needs to be warmed.

As an example, in the executing (S40) of the battery cooling mode, electric energy generated during the regenerative braking is consumed (that is, the IN state of the regenerative braking energy is entered) by operating the first and second compressors 33a and 33b and the fan motor of the passenger air-conditioning apparatus 30. At the same time, the first and second 4-way valves 34a and 34b switch an air-conditioning refrigerant path. Thus, battery heat is released (that is, the OUT state of the regenerative braking energy is entered) through heat exchange in the first and second battery chillers 31a and 31b, and then is discharged outside of the first and second outer heat exchangers 35a and 36b (that is, the OUT state of the regenerative braking energy is entered).

In contrast, in the executing (S50) of the battery warming mode, the electric energy generated during the regenerative braking is consumed by (that is, the IN state of the regenerative braking energy is entered) by operating the first and second compressors 33a and 33b and the fan motor of the passenger air-conditioning apparatus 30. At the same time, the first and second 4-way valves 34a and 34b switch the air-conditioning refrigerant path. Thus, outside air heat is absorbed (that is, the OUT state of the regenerative braking energy is entered) in the first and second heat exchangers 35a and 35b, and then the battery coolant is warmed (that is, the OUT state of the regenerative braking energy is entered) through the heat exchange in the first and second battery chillers 31a and 31b.

As an example, the executing (S70) of the battery constant-temperature mode after the executing (S40) of the battery cooling mode and the executing (S50) of the battery warming mode occurs when a minimum temperature for battery heat management is reached (S60). The reason for this is that the temperature of the battery pack 20 continues to fall when the battery cooling mode is maintained and to rise when the battery warming mode is maintained.

To this end, the minimum temperature for battery heat management serves as a surrounding environment-independent temperature at which battery performance and efficiency are optimally maintained, and has a value that is set to vary with a type of battery. For example, in the case of a lithium-ion battery, the minimum temperature for battery heat management is set to have a value of approximately 20 to 30° C.

The executing (S40) of the battery cooling mode, the executing S50) of the battery warming mode, and the executing (S70) of the battery constant-temperature mode will be described in detail below with reference to FIGS. 1 and 3 to 5.

Specifically, the executing (S40) of the battery cooling mode, as illustrated in FIG. 2, includes Step S41 of switching to a battery heat release mode to operate the passenger air-conditioning apparatus 30, Step S42 of operating a compressor (ECOMP) and a fan motor, Step S43 of releasing heat of the air-conditioner refrigerant (that is, an operation of releasing heat to outside air), Step S44 of supplying a high-temperature battery coolant using a battery chiller, and Step S45 of cooling a battery coolant and discharging absorbed heat to the outside through heat exchange in the battery chiller.

As an example, the switching (S41) to the battery heat release mode to operate the passenger air-conditioning apparatus 30 means that the passenger air-conditioning apparatus 30 switches to the battery cooling mode from a basic cooling mode and warming mode.

Figure 3:
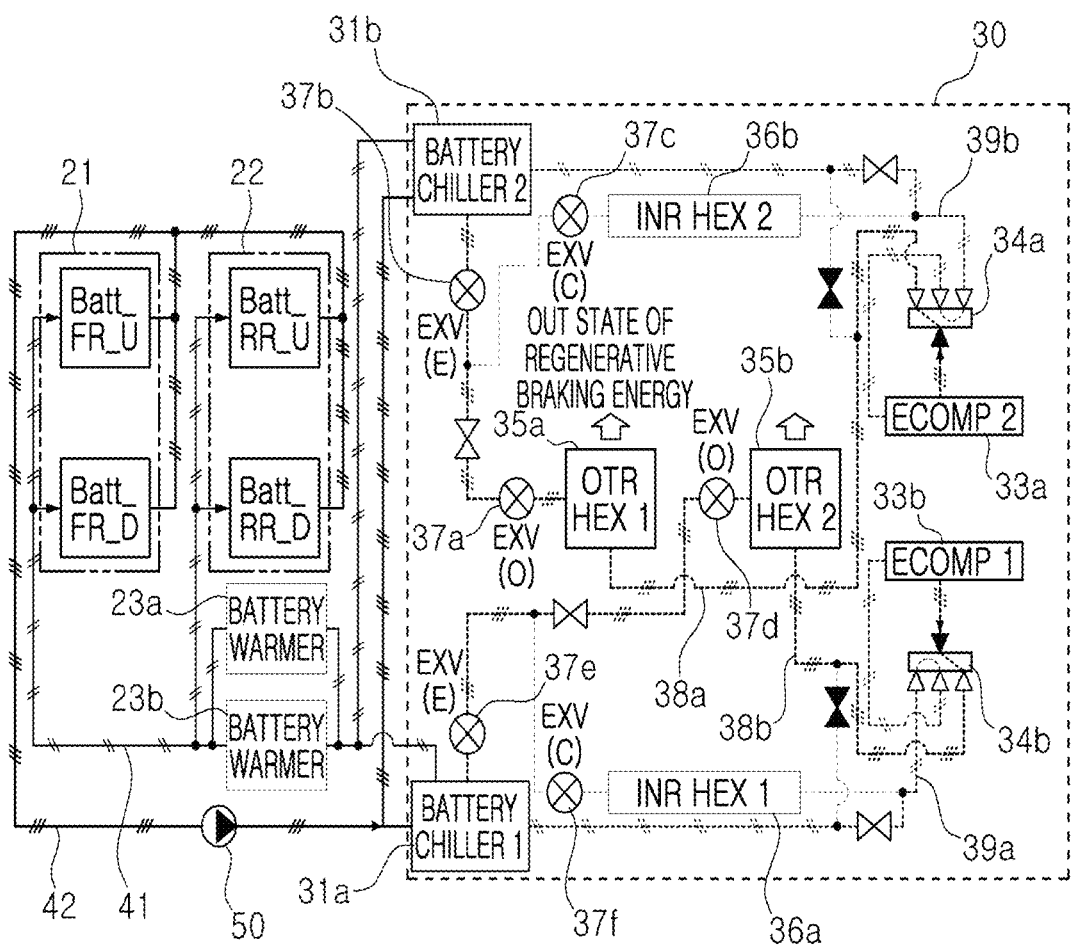
FIG. 3 is a diagram illustrating a state where the system for converting regenerative braking energy in an eco-friendly vehicle operates in a battery cooling mode.

FIGS. 1 and 3 both illustrate a state where the system 10 for converting regenerative braking energy operates in the executing (S40) of the battery cooling mode.

First, the first and second compressors 33a and 33b and the fan motor are driven with the ECOMP drive signal (b) (that is, the IN state of the regenerative braking energy is entered), and thus a compressor (ECOMP) and fan motor operation is performed to consume regenerative braking electric energy (S42).

In response to the 4-WAY V/V signal (c), the first and second 4-way valves 34a and 34b switch the air-conditioning refrigerant path toward the condensers, respectively, of the first and second outer heat exchangers 35a and 35b. At the same time, in response to the EXV signal (d), the first, second, third, fourth, fifth, and sixth valves 37a, 37b, 37c, 37d, 37e, and 37f allow for one of the opening, closing, and expansion operations. Thus, the operation of releasing heat of the air-conditioning refrigerant (that is, the operation of releasing heat to outside air) is performed (S43).

In addition, with the first and second battery chillers 31a and 31b, when the battery coolant pump 50 is driven in response to the pump drive signal (e), the high-temperature battery coolant is supplied through the battery coolant out-line 42 (S44). While this supplying is performed, a low-temperature battery coolant, which undergoes the heat exchange, returns to the battery pack 20 through the battery warmer 23 along the battery coolant in-line 41. In this case, the pump drive signal (c) may be controlled by a BSM instead of the controller 60.

Accordingly, the first and second battery chillers 31a and 31b perform heat exchange (the OUT state of the regenerative braking energy is entered) in which a low-temperature air-conditioning refrigerant lowers a high battery coolant temperature. At the same time, the first and second outer heat exchangers 35a and 35b perform outward heat release to the atmosphere (that is, the OUT state of the regenerative braking energy is entered) by the air-conditioning refrigerant repeatedly flowing through the first and second refrigerant lines 38a and 38b. Thus, through the heat exchange in the battery chiller, the battery coolant is cooled, and the absorbed heat is discharged to the outside (S45).

As an example, each of the first, second, third, fourth, fifth, and sixth expansion valves 37a, 37b, 37c, 37d, 37e, and 37f is controlled to enter one of an open (EXV OPEN) state, a closed (EXV CLOSE) state, and an expansion (EXV EXPANSION) state. Three cases are assumed. The first expansion valve 37a and the fourth expansion valve 37d are open (EXV O). The second expansion valve 37b and the fifth expansion valve 37e are expanded (EXV E). The third expansion valve 37c and the sixth expansion valve 37f are closed (EXV C).

Accordingly, in the opening (EXV O) of the first expansion valve 37a and the fourth expansion valve 37d, the air-conditioning refrigerant circulates along the first and second outer refrigerant lines 38a and 38b. In the expanding (EXV E) of the second expansion valve 37b and the fifth expansion valve 37e, the air-conditioning refrigerant that flows out of the outlets in the first and second outer heat exchangers 35a and 35b is sprayed in the form of droplets through a narrow hole in the expansion valve 37 for evaporation. Thus, the high-temperature battery coolant that flows through the first and second battery chillers 31a and 31b is cooled inside the first and second battery chillers 31a and 31b.

In contrast, in the closing (EXV C) of the third expansion valve 37c and the sixth expansion valve 37f, the air-conditioning refrigerant is blocked from flowing along the first and second inner refrigerant lines 39a and 39b.

In addition, the first and second battery warmers 23a and 23b operate in such a manner that the battery coolant that flows out of the first and second battery chillers 31a and 31b into the coolant in-line 41 does not flow directly to the first and second batteries 21 and 22.

Figure 4:
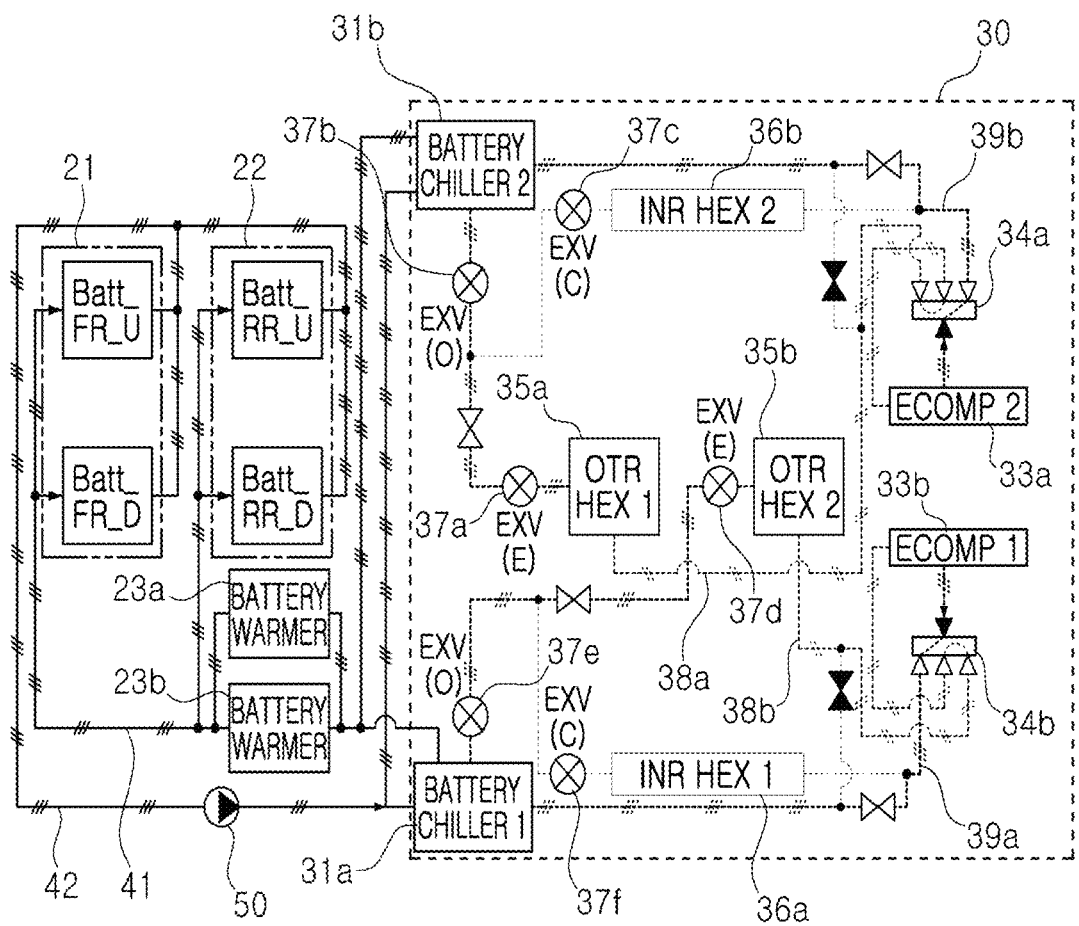
FIG. 4 is a diagram illustrating a state where the system for converting regenerative braking energy in an eco-friendly vehicle operates in a battery warming mode.

FIGS. 1 and 4 both illustrate a state where the system 10 for converting regenerative braking energy operates in the executing (S50) of the battery warming mode.

Specifically, the executing (S50) of the battery warming mode, as illustrated in FIG. 2, includes Step S51 of switching to a battery heat absorption mode to operate the passenger air-conditioning apparatus 30, Step S52 of operating the compressor (ECOMP) and the fan motor, Step S53 of absorbing heat by the air-conditioning refrigerant (that is, an operation of absorbing heat of outside air), Step S54 of supplying a low-temperature battery coolant using the battery chiller, and Step S55 of warming the battery coolant through the heat exchange in the battery chiller.

As an example, the switching (S51) to the battery heat absorption mode to operate the passenger air-conditioning apparatus 30 means that the passenger air-conditioning apparatus 30 switches to the battery warming mode from the basic cooling mode and warming mode.

First, the first and second compressors 33a and 33b and the fan motor are driven with the ECOMP drive signal (b) (that is, the IN state of the regenerative braking energy is entered), and thus the compressor (ECOMP) and fan motor operation is performed to consume the regenerative braking electric energy (S52).

In response to the 4-WAY V/V signal (c), the first and second 4-way valves 34a and 34b switch the air-conditioning refrigerant path toward the condensers, respectively, of the first and second outer heat exchangers 35a and 35b. At the same time, in response to the EXV signal (d), the first, second, third, fourth, fifth, and sixth valves 37a, 37b, 37c, 37d, 37e, and 37f allow for one of the opening, closing, and expansion operations. Thus, the operation of absorbing heat by the air-conditioning refrigerant (that is, the operation of absorbing heat of outside air and thus warming the air-conditioning refrigerant) is performed (S53).

In addition, with the first and second battery chillers 31a and 31b, when the battery coolant pump 50 is driven in response to the pump drive signal (e), the low-temperature battery coolant is supplied through the battery coolant out-line 42 (S44). While this supplying is performed, a high-temperature battery coolant, which undergoes the heat exchange, returns to the battery pack 20 through the battery warmer 23 along the battery coolant in-line 41. In this case, the pump drive signal (e) may be controlled by the BSM instead of the controller 60.

Accordingly, the first and second battery chillers 31a and 31b perform heat exchange (the OUT state of the regenerative braking energy is entered) in which an air-conditioning refrigerant having a relatively higher than the battery coolant raises a low battery coolant temperature. At the same time, the first and second outer heat exchangers 35a and 35b perform heat absorption from the atmosphere (that is, the OUT state of the regenerative braking energy is entered) by the air-conditioning refrigerant repeatedly flowing through the first and second refrigerant lines 38a and 38b. Thus, through the heat exchange in the battery chiller, the battery coolant is warmed (S55).

As an example, each of the first, second, third, fourth, fifth, and sixth expansion valves 37a, 37b, 37c, 37d, 37e, and 37f is controlled to enter one of the open (EXV OPEN) state, the closed (EXV CLOSE) state, and the expansion (EXV EXPANSION) state. Three cases are assumed. The first expansion valve 37a and the fourth expansion valve 37d are expanded (EXV E). The second expansion valve 37b and the fifth expansion valve 37e are open (EXV O). The third expansion valve 37c and the sixth expansion valve 37f are closed (EXV C).

Accordingly, in the opening (EXV O) of the second expansion valve 37b and the fifth expansion valve 37e, the air-conditioning refrigerant circulates along the first and second outer refrigerant lines 38a and 38b. In the expanding (EXV E) of the first expansion valve 37a and the fourth expansion valve 37d, the air-conditioning refrigerant that flows out of the outlets in the first and second outer heat exchangers 35a and 35b is sprayed in the form of droplets through the narrow hole in the expansion valve 37 for evaporation. Thus, the air-conditioning refrigerant absorbs outward heat (that is, the atmosphere) in the first and second outer heat exchangers 35a and 35b, and then flows to the first and second battery chillers 31a and 31b. Accordingly, the air-conditioning refrigerant warms the low-temperature battery coolant that flows through the first and second battery chillers 31a and 31b.

In contrast, in the closing (EXV C) of the third expansion valve 37c and the sixth expansion valve 37f, the air-conditioning refrigerant is blocked from flowing along the first and second inner refrigerant lines 39a and 39b.

In addition, the first and second battery warmers 23a and 23b warm the battery coolant that flows out of the first and second battery chillers 31a and 31b into the coolant in-line 41 (that is, the heater operates) and then cause the battery coolant to flow to the first and second batteries 21 and 22.

Figure 5:
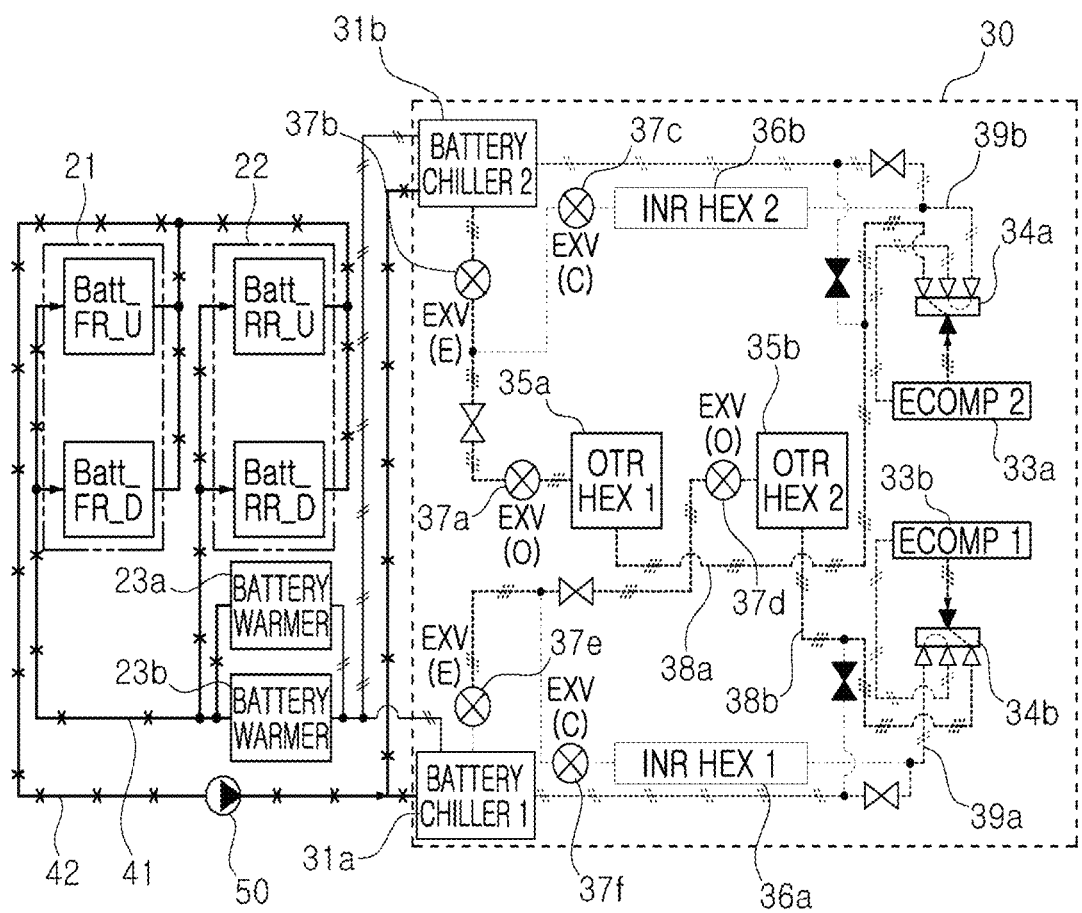
FIG. 5 is a diagram illustrating a state where the system for converting regenerative braking energy in an eco-friendly vehicle operates in a battery constant-temperature mode.

FIGS. 1 and 5 both illustrate a state where the system 10 for converting regenerative braking energy operates in the executing (S70) of the battery consistent-temperature mode.

As an example, the first and second compressors 33a and 33b and the fan motor are in a driven state, and the first and second 4-way valves 34a and 34b switch the air-conditioning refrigerant path toward the condensers of the first and second outer heat exchangers 35a and 35b. Furthermore, the first, second, third, fourth, fifth, and sixth expansion valves 37a, 37b, 37c, 37d, 37e, and 37f operate in the following states. The first and fourth expansion valves 37b and 37e are open (EXV O), the second and fifth expansion valves are expanded (EXV E), and the third and sixth expansion valves are closed (EXV C). Particularly, the second and fifth expansion valves 37b and 37e are expanded (EXV E). Thus, the air-conditioning refrigerant evaporates the inlets in the first and second battery chillers 31a and 31b.

Then, the battery coolant that flows out of the battery coolant out-line 42 flows through the first and second battery chillers 31a and 31b and flows to the battery coolant in-line 41. At the same time, the air-conditioning refrigerant that circulates along the first and second outer refrigerant lines 38a and 38b flows through the first and second battery chillers 31a and 31b. Thus, the battery coolant and the air-conditioning refrigerant continue to exchange heat therebetween.

In addition, the first and second battery warmers 23a and 23b warms the battery coolant that flows out of the first and second battery chillers 31a and 31b and flows to the battery coolant in-line 41 (that is, the heater operates) and thus raise the temperature of the battery coolant to the minimum temperature for the battery heat management and then cause the battery coolant to flow to the first and second batteries 21 and 22.

Particularly, in the executing (S70) of the battery constant-temperature mode, the first and second battery warmers 23a and 23b warm the battery coolant in a case where due to heat exchange with the air-conditioning refrigerant, the temperature of the battery coolant falls below the minimum temperature for battery heat management. However, the first and second battery warmers 23a and 23b do not warm the battery coolant in a case where due to the heat exchange with the air-conditioning refrigerant, the temperature of the battery coolant rises above the minimum temperature for battery heat management.

Therefore, in the executing (S70) of the battery constant-temperature mode, in response to the ECOMP drive signal (b), the first and second compressors 33a and 33b and the fan motor are driven to repeatedly execute the battery cooling mode (S40) or execute the battery warming mode (S50). Accordingly, the minimum temperature for battery heat management is maintained (S60). Thus, the regenerative braking energy can be converted to keep the temperature of the battery coolant constant.

As described above, in the system for and the method of converting regenerative braking energy according to the implementations, which are installed or implemented, respectively, the controller 60, controlling a heat exchange operation, of the system for converting regenerative braking energy, in which the battery pack 20 and the passenger air-conditioning apparatus 30 are connected by the coolant circulation line 40 connected to the battery chiller 31 to which the outer refrigerant lines 38a and 38b are connected, determines, during the regenerative braking by the regenerative braking apparatus, whether or not the amount of remaining battery power reaches or exceeds a predetermined threshold. In a case where the amount of remaining battery power reaches or exceeds the predetermined threshold, the controller 60 controls: the consumption of the regenerative braking energy by the compressor 33; the switching of the flow of the air-conditioning refrigerant by the 4-way valve 34 toward the condenser or radiator of the outer heat exchanger 35; the evaporation of the air-conditioning refrigerant by the expansion operation of the expansion valves 37b and 37e in the direction of the battery chiller 31 or the expansion valves 37a and 37c in the direction of the outer heat exchanger 35; and the operating of the outer heat exchanger 35 for heat release to the outside or heat absorption from the outside. Thus, the battery degradation can be prevented without any side effects. Particularly, temperature management can be performed for battery heat management.

What is claimed is:

1. A method for converting regenerative braking energy in a vehicle, the vehicle including a regenerative braking apparatus and a battery chiller configured to exchange heat between a battery coolant and an air-conditioning refrigerant, the battery chiller being connected to a battery coolant circulation line for a battery pack and an outer refrigerant line for a passenger air-conditioning apparatus, the method comprising:

determining whether an amount of remaining battery power of the battery pack being greater than or equal to a predetermined threshold during a regenerative braking of the vehicle;

based on determining that amount of remaining battery power of the battery pack is greater than or equal to the predetermined threshold, determining, by a controller, whether to execute a battery cooling mode for cooling the battery coolant or a battery warming mode for warming the battery coolant; and based on determining to execute the battery cooling mode, (i) driving a compressor disposed at the outer refrigerant line for the passenger air-conditioning apparatus, (ii) switching, by a 4-way valve, an air-conditioning refrigerant path, (iii) absorbing heat from the battery coolant based on evaporation of the air-conditioning refrigerant by an expansion operation of an expansion valve, and (iv) releasing, by the air-conditioning refrigerant in an outer heat exchanger, heat to an outside of the vehicle.

2. The method of claim 1, wherein driving the compressor comprises driving the compressor with the regenerative braking energy that is generated by the regenerative braking.

3. The method of claim 1, wherein switching the air-conditioning refrigerant path comprises switching the 4-way valve to enable a flow of the air-conditioning refrigerant toward a condenser of the outer heat exchanger.

4. The method of claim 1, wherein the expansion valve is disposed in a direction of an inlet in the battery chiller and configured to perform the expansion operation.

5. The method of claim 1, wherein the air-conditioning refrigerant in the outer heat exchanger is configured to release the heat to the outside while a condenser of the vehicle carries the air-conditioning refrigerant based on the 4-way valve switching the air-conditioning refrigerant path.

6. The method of claim 1, further comprising:
executing the battery cooling mode; and
based on the battery coolant reaching a minimum temperature for battery heat management while executing the battery cooling mode, switching to a battery constant-temperature mode for maintaining a temperature of the battery coolant.

7. The method of claim 6, further comprising:
executing the battery constant-temperature mode; and
while the air-conditioning refrigerant circulates along the outer refrigerant line in the battery constant-temperature mode, maintaining at least one of (i) switching of the air-conditioning refrigerant path by the 4-way valve, (ii) the expansion operation of the expansion valve, (iii) evaporation of the air-conditioning refrigerant, (iv) heat exchange in the battery chiller, or (v) releasing of the heat of the air-conditioning refrigerant in the outer heat exchanger to the outside,
wherein the battery coolant is configured to be warmed in a battery warmer that is disposed at a battery coolant in-line, the battery coolant in-line being configured to carry the battery coolant to thereby maintain the minimum temperature for battery heat management.

8. A method for converting regenerative braking energy in a vehicle, the vehicle including a regenerative braking apparatus and a battery chiller configured to exchange heat between a battery coolant and an air-conditioning refrigerant, the battery chiller being connected to a battery coolant circulation line for a battery pack and an outer refrigerant line for a passenger air-conditioning apparatus, the method comprising:

determining whether an amount of remaining battery power of the battery pack is greater than or equal to a predetermined threshold during a regenerative braking;

based on determining that amount of remaining battery power of the battery pack is greater than or equal to the predetermined threshold, determining, by a controller, whether to execute a battery cooling mode for cooling the battery coolant cooling or a battery warming mode for warming the battery coolant; and based on determining to execute the battery warming mode, (i) driving a compressor disposed at the outer refrigerant line for the passenger air-conditioning apparatus, (ii) switching, by a 4-way valve, an air-conditioning refrigerant path, (iii) transferring heat to the battery coolant based on evaporation of the air-conditioning refrigerant by an expansion operation of an expansion valve, (iv) absorbing, by the air-conditioning refrigerant in an outer heat exchanger, heat from an outside of the vehicle, and (v) warming, by a battery warmer, the battery coolant.

9. The method of claim 8, wherein driving the compressor comprising driving the compressor with regenerative braking energy that is generated by the regenerative braking.

10. The method of claim 8, wherein the 4-way valve switches a flow of the air-conditioning refrigerant toward a radiator of the outer heat exchanger.

11. The method of claim 8, wherein the expansion valve is disposed in a direction of an outlet in the outer heat exchanger and configured to perform the expansion operation.

12. The method of claim 8, wherein the air-conditioning refrigerant in the outer heat exchanger is configured to absorb the heat from the outside while a radiator of the vehicle carries the air-conditioning refrigerant based on the 4-way valve switching the air-conditioning refrigerant path.

13. The method of claim 8, further comprising:
executing the battery warming mode; and
based on the battery coolant reaching a minimum temperature for battery heat management while executing the battery warming mode, switching to a battery constant-temperature mode for maintaining a temperature of the battery coolant.

14. The method of claim 13, further comprising:
executing the battery constant-temperature mode; and
while the air-conditioning refrigerant circulates along the outer refrigerant line in the battery constant-temperature mode, maintaining one of (i) driving of the compressor, (ii) switching of the air-conditioning refrigerant path by the 4-way valve, (iii) the expansion operation of the expansion valve, (iv) evaporation of the air-conditioning refrigerant, (v) heat exchange in the battery chiller, or (vi) absorbing of the heat from the outside by the air-conditioning refrigerant in the outer heat exchanger,
wherein the battery coolant is warmed in a battery warmer disposed a battery coolant in-line configured to carry the battery coolant, the battery coolant being configured to maintain the minimum temperature for battery heat management.

15. A vehicle comprising:
a battery pack;
a regenerative braking apparatus;
a system disposed at vehicular roof of the vehicle and configured to convert regenerative braking energy, the system comprising (i) a passenger air-conditioning apparatus including a battery coolant circulation line for the battery pack that connects a battery chiller to an outer refrigerant line and (ii) a controller, wherein the controller is configured to determine whether an amount of remaining battery power is greater than or equal to a predetermined threshold during a regenerative braking of the regenerative braking apparatus, and wherein the controller is configured to,
- based on the amount of remaining battery power being greater than or equal to the predetermined threshold, execute a battery cooling mode in which (i) the regenerative braking energy is consumed by driving a compressor disposed at the outer refrigerant line for the passenger air-conditioning apparatus and (ii) a 4-way valve switches an air-conditioning refrigerant path toward a condenser of an outer heat exchanger such that heat of a battery coolant is absorbed by evaporating the air-conditioning refrigerant by an expansion operation of an expansion valve in a direction of the battery chiller, and then the absorbed heat is released to an outside of the vehicle from the outer heat exchanger, or
- based on the amount of remaining battery power being greater than or equal to the predetermined threshold, execute a battery warming mode in which (i) the regenerative braking energy is consumed by driving the compressor and (ii) the 4-way valve switches the air-conditioning refrigerant path toward a radiator of the outer heat exchanger such that heat is transferred to the battery coolant by evaporating the air-conditioning refrigerant by the expansion operation of the expansion valve in a direction of the outer heat exchanger, and then heat is absorbed from the outside in the outer heat exchanger, wherein the battery coolant being configured to be warmed in a battery warmer.

16. The vehicle of claim 15, wherein the controller is configured to, based on the battery coolant reaching a minimum temperature for battery heat management while executing the battery cooling mode, maintain, while the air-conditioning refrigerant circulates along the outer refrigerant line, one of (i) driving of the compressor, (ii) switching of the air-conditioning refrigerant path by the 4-way valve, (iii) the expansion operation of the expansion valve, (iv) evaporation of the air-conditioning refrigerant, (v) heat exchange in the battery chiller, or (vi) releasing of the heat of the air-conditioning refrigerant in the outer heat exchanger to the outside, wherein the battery warmer is disposed at a battery coolant in-line configured to carry the battery coolant, and wherein the controller is configured to execute a battery constant-temperature mode to thereby maintain the minimum temperature for battery heat management.

17. The vehicle of claim 15, wherein the controller is configured to, based on the battery coolant reaching a minimum temperature for battery heat management while executing the battery warming mode, maintain, while the air-conditioning refrigerant circulates along the outer refrigerant line, one of (i) driving of the compressor, (ii) switching of the air-conditioning refrigerant path by the 4-way valve, (iii) the expansion operation of the expansion valve, (iv) evaporation of the air-conditioning refrigerant, (v) heat exchange in the battery chiller, or (vi) releasing of the heat of the air-conditioning refrigerant in the outer heat exchanger to the outside, wherein the battery warmer is disposed at a battery coolant in-line configured to carry the battery coolant, and wherein the controller is configured to execute a battery constant-temperature mode to thereby maintain the minimum temperature for battery heat management.

* * * * *